(12) United States Patent
Hammerschmidt

(10) Patent No.: US 9,527,352 B2
(45) Date of Patent: Dec. 27, 2016

(54) INDIRECT TIRE PRESSURE MONITORING SYSTEMS AND METHODS USING MULTIDIMENSIONAL RESONANCE FREQUENCY ANALYSIS

(71) Applicant: Infineon Technologies AG, Neubiberg (DE)

(72) Inventor: Dirk Hammerschmidt, Villach (AT)

(73) Assignee: Infineon Technologies AG, Neubiberg (DE)

(*) Notice: Subject to any disclaimer, the term of this patent is extended or adjusted under 35 U.S.C. 154(b) by 378 days.

(21) Appl. No.: 13/919,620

(22) Filed: Jun. 17, 2013

(65) Prior Publication Data

US 2014/0372006 A1 Dec. 18, 2014

(51) Int. Cl.
*B60C 23/06* (2006.01)
(52) U.S. Cl.
CPC .................. *B60C 23/062* (2013.01)
(58) Field of Classification Search
CPC .. B60C 23/062; B60C 23/002; B60T 8/17616; G01L 17/00
See application file for complete search history.

(56) References Cited

U.S. PATENT DOCUMENTS

| | | | |
|---|---|---|---|
| 6,064,931 A * | 5/2000 | Sawada et al. | 701/41 |
| 6,385,553 B1 * | 5/2002 | Naito | B60C 23/062 702/138 |
| 8,077,025 B2 | 12/2011 | Hammerschmidt et al. | |
| 8,087,301 B2 | 1/2012 | Hammerschmidt et al. | |
| 8,207,839 B2 | 6/2012 | Fujita | |
| 8,299,910 B2 | 10/2012 | Hammerschmidt et al. | |

(Continued)

FOREIGN PATENT DOCUMENTS

CN 102762394 A 10/2012
EP 0783982 A1 7/1997
(Continued)

OTHER PUBLICATIONS

Persson, Niclas, *Event Based Sampling with Application in Spectral Estimation*, Linkoeping Studies and Technology Thesis No. 981, Department of Control & Communication, Department of Electrical Engineering, www.control.isy.liu.se, © 2002, Printed by IniTryck, Linkoeping, Sweden, 112 pages.

(Continued)

*Primary Examiner* — Rodney Butler
(74) *Attorney, Agent, or Firm* — Schiff Hardin LLP

(57) ABSTRACT

An indirect tire pressure monitoring systems (TPMS) and methods that utilize anti-lock braking system (ABS) sensed signals coupled to circuitry and/or controllers to process the sensed signals using a multidimensional resonance frequency analysis (MRFA) technique. Additional information from other sensed signals or stored data settings for non-tire variables and parameters can be incorporated into the MRFA. Thus, an indirect TPMS comprises at least one signal from an ABS, such as a wheel speed signal, and an electronic control unit (ECU) that processes the at least one signal from the ABS using at least one MRFA technique. The MRFA uses a spectral analysis of tire vibrations as determined from the sensed ABS signals over different points in the spectrum that can reflect different vibration modes and different corresponding resonance frequencies.

18 Claims, 5 Drawing Sheets

(56) References Cited

U.S. PATENT DOCUMENTS

| | | | |
|---|---|---|---|
| 8,347,704 B2 | 1/2013 | Kawasaki | |
| 8,593,273 B2 | 11/2013 | Gotschlich et al. | |
| 8,700,286 B2 | 4/2014 | Steiner et al. | |
| 8,868,290 B2 | 10/2014 | Hammerschmidt | |
| 2001/0008083 A1 | 7/2001 | Brown | |
| 2002/0059826 A1* | 5/2002 | Ono | B60C 23/062 73/146.5 |
| 2003/0179086 A1* | 9/2003 | Nantz | B60C 23/0416 340/445 |
| 2004/0095231 A1* | 5/2004 | Ichinose | B60C 23/0408 340/442 |
| 2004/0099055 A1* | 5/2004 | Komatsu et al. | 73/146 |
| 2004/0123654 A1* | 7/2004 | Komatsu et al. | 73/146 |
| 2005/0235744 A1* | 10/2005 | Ogawa | 73/146 |
| 2007/0139179 A1* | 6/2007 | Yanase | 340/443 |
| 2009/0105921 A1* | 4/2009 | Hanatsuka et al. | 701/80 |
| 2009/0282906 A1* | 11/2009 | Kawasaki et al. | 73/146.5 |
| 2010/0013617 A1* | 1/2010 | Fujita et al. | 340/443 |
| 2010/0073158 A1* | 3/2010 | Uesaka et al. | 340/450.2 |
| 2010/0087981 A1* | 4/2010 | Orozco-Perez | 701/30 |
| 2010/0164704 A1* | 7/2010 | Lindskog | B60C 23/062 340/442 |
| 2010/0318308 A1* | 12/2010 | Gustavsson et al. | 702/98 |
| 2011/0219864 A1* | 9/2011 | Yukawa et al. | 73/146.3 |
| 2012/0221196 A1* | 8/2012 | Seymour et al. | 701/36 |
| 2013/0035834 A1* | 2/2013 | Couch et al. | 701/70 |
| 2013/0104640 A1 | 5/2013 | Gotschlich | |

FOREIGN PATENT DOCUMENTS

| | | | |
|---|---|---|---|
| EP | 0925960 A2 | | 6/1999 |
| JP | H05133831 A | * | 5/1993 |
| JP | 08219920 A | * | 8/1996 |
| JP | 9-323515 | | 12/1997 |
| JP | H09323515 A | * | 12/1997 |
| JP | 11198619 A | * | 7/1999 |
| JP | 2000355203 A | * | 12/2000 |
| WO | WO 2008/113376 | | 9/2008 |

OTHER PUBLICATIONS

Infineon, *Differential Two-Wire Hall Effect Sensor IC*, TLE4942, TLE4942C, Feb. 2002, 19 pages.

Thiriez, Kristin K., *Evaluatin of Indirect Tire Pressure Monitoring Systems Using Data From NCSA's Tire Pressure Special Study*, 8 pages, 2006.

Journal of Automobile Engineering, Proceedings of the Institution of Mechanical Engineers, Part D, *Sensing Type Pressure, Damper Condition and Wheel Balance from Vibration Measurements*, 1997, available at http://pid.sagepub.com/content/211/4/257, pp. 256-265, Published by SAGE.

*Tire-Pressure Monitoring System*, Wikipedia, 8 pages, as obtained on Jun. 17, 2013.

Application and File History for U.S. Appl. No. 13/332,921, filed Dec. 21, 2011, issued as U.S. Pat. No. 8,700,286 on Apr. 15, 2014, inventors Steiner et al.

Office Action dated Feb. 15, 2016 for Chinese Patent Application No. 201410268105.5.

* cited by examiner

INDIRECT TIRE PRESSURE MONITORING SYSTEMS AND METHODS USING MULTIDIMENSIONAL RESONANCE FREQUENCY ANALYSIS

TECHNICAL FIELD

The invention relates generally to indirect tire pressure monitoring and more particularly to systems and methods using multidimensional resonance frequency analysis of sensor data for indirect tire pressure monitoring.

BACKGROUND

There are two general approaches to monitoring the pressure in vehicle tires: direct and indirect. Direct tire pressure monitoring systems (TPMS) typically comprise a wheel module having one or more sensors and electronics mounted in or to the tire to directly measure the tire's pressure and wirelessly transmit measurement data to the vehicle. Indirect TPMSs generally utilize information from other vehicle sensors and/or systems to indirectly estimate a tire's pressure without TPMS sensors or electronics being located in the tire. Indirect TPMS is attractive because it can be more cost-efficient than direct TPMS.

Many conventional indirect TPMS use wheel speed signals from the anti-lock brake system (ABS). For a typical passenger vehicle having four tires, the conventional indirect TPMS compares speed signals from each of the four wheels to determine whether an individual wheel is rotating faster because of a loss of pressure and related decreased in diameter of the tire. One drawback to this kind of indirect TPMS is that the systems cannot detect whether all wheels have lost pressure over time.

One approach for overcoming this drawback is to utilize a resonance frequency method (RFM) of analysis of a single resonance frequency in the sensed data signals from the ABS. U.S. Pat. Nos. 8,207,839 and 8,347,704 describe different kinds of RFM analysis of a time series of sensed data signals that includes auto-regression analysis, Fast Fourier analysis, a Bayesian analysis, or analysis based on a linear estimation model. While different kinds of analysis are taught by these patents, the purpose of each of these known RFM approaches is to reduce the amount of computation power required in an on-board processor to do the calculations necessary to identify a single resonance frequency from which tire pressure can be indirectly estimated.

While RFM analysis can represent an improvement over conventional indirect TPMS, the accuracy of the results can be impacted by the low resolution of the ABS sensed data signals and by other factors that can influence the resonance frequency beyond just the tire pressure in an individual tire. Therefore, there is a need for improved systems and methods for indirect tire pressure monitoring.

SUMMARY

In an embodiment, an indirect tire pressure monitoring system (TPMS) comprises an antilock braking system (ABS) configured to provide a wheel speed signal; and an electronic control unit (ECU) coupled to the ABS and configured to process the sensed signals using a multidimensional resonance frequency analysis (MRFA) that includes a spectral analysis identifying at least two tire vibration modes in the wheel speed signal and isolates at least one characteristic affecting the at least two tire vibration modes.

In an embodiment, a method of indirect tire pressure monitoring of individual tires on a vehicle comprises extracting data from an antilock braking system for a tire, the data representative of wheel speed of the tire; and using a signal processing system to analyze the data to determine a plurality of resonance frequencies associated with the data and then analyze the plurality of resonance frequencies to determine at least an estimated tire pressure for the tire.

BRIEF DESCRIPTION OF THE DRAWINGS

The invention may be more completely understood in consideration of the following detailed description of various embodiments of the invention in connection with the accompanying drawings, in which.

Figure 1:
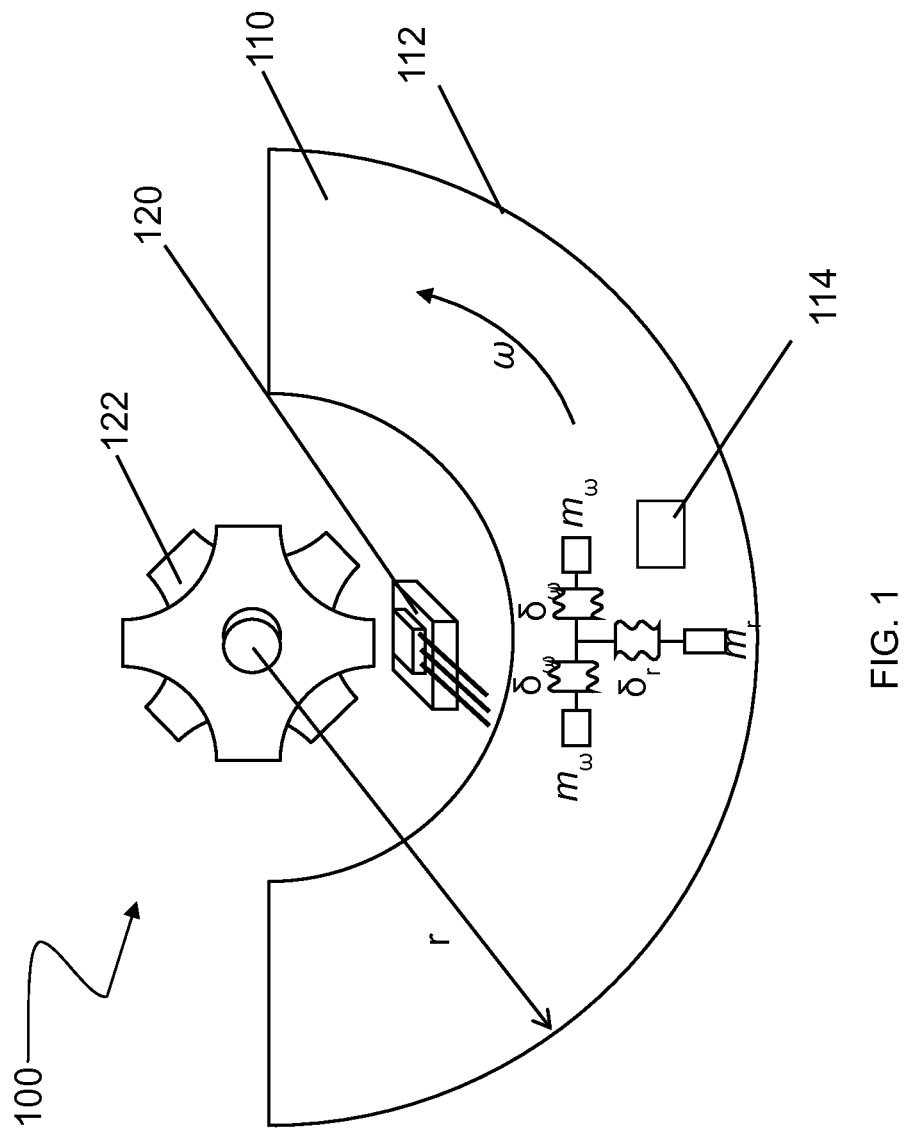
FIG. 1 is a schematic diagram of a wheel sensor system and tire according to an embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Embodiments relate to an indirect tire pressure monitoring systems (TPMS) and methods that utilize anti-lock braking system (ABS) sensed signals coupled to an electronic control unit (ECU) that may comprise circuitry and/or controllers to process the sensed signals using a multidimensional resonance frequency analysis (MRFA) technique. In some embodiments, additional information from other sensed signals or stored data settings for non-tire variables and parameters can be incorporated into the MRFA. Unlike conventional MRFA approaches that look for a single resonance frequency, the MRFA of embodiments uses a spectral analysis of tire vibrations as determined from the sensed ABS signals over different points in the spectrum that can reflect different vibration modes and different corresponding resonance frequencies. In some embodiments, an enhanced transmission protocol for the sensed ABS signals to the ECU for analysis by the ECU can result in an increased signal to noise ratio (SNR) for the MRFA technique, thereby enabling identification of potential resonance frequencies that might otherwise fall below a conventional noise threshold.

In various embodiments, the sensed data signals can include higher resolution data from the ABS. The different vibration modes can include radial vibration, angular vibration, and other types of tire, wheel or drive train vibrations, as well as higher order harmonics of these vibrations, and can be optimized for MRFA of multiple physical variables associated with the tire in addition to tire pressure. Examples of such additional tire variables that can impact different resonance frequency modes include tire speed, temperature, thickness, size, profile, wear, age, and materials, among others. Other non-tire related variables can also be utilized in the MRFA and can include ambient conditions; vehicle driving data related to acceleration, turning and braking maneuvers; and vehicle condition parameters including weight, equipment options, and feature settings such as suspension modes or traction control, among others.

In general, wheel speed corresponds to the first order frequency of the sensed signal from the ABS, with the wheel speed corresponding to a duration between pulses. In one embodiment, there are about 48 pulses per rotation, which provides good granularity. Changes in these characteristics can then be analyzed to determine whether any are indicative of a change in the pressure of the tire.

For example, indirect TPMS can detect a change in resonance frequency of a tire. A decrease of the resonance frequency could be indicative of a lower tire pressure in the tire. Information then can be transmitted from indirect TPMS to other circuitry associated with the TPMS or vehicle ECU in several manners. In one embodiment, the sensed signals and optional non-tire variables and parameters are transmitted to and analyzed by an electronic control unit (ECU). In another embodiment, other kinds of sensed signals and optional non-tire variables and parameters can be communicated to an ECU or other vehicle microprocessor or controller system for utilization in the MFRA technique. Any of these signals, variable or parameters, as well as the resonance frequencies and inferred tire pressures of each tire may be communicated to other vehicle microprocessor or controller systems for utilization by the vehicle in other operations and/or display for the vehicle operator.

The MRFA performed by the ECU, vehicle microprocessor and/or other controller circuitry can be carried out by a variety of circuit, controller, and microprocessor components that are programmed or configured to perform the MRFA as described herein, either in a single component or with various portions of the MRFA performed by different components in coordination with each other. The MRFA can be performed based on digital data and digital techniques, including the use of a digital signal processor (DSP), analog data and analog techniques, or any combination thereof. In various embodiments, the systems and methods for performing the MRFA can accomplish the MRFA based on various analysis techniques that can include DSP analysis, auto-regression analysis, discrete Fourier transform, wavelet transform, Gabor transform, Fast Fourier analysis, digital or analog filter banks, a Bayesian analysis, Q factor analysis, harmonic analysis and/or analysis based on a linear estimation model, among others and alone or in combination.

Referring to FIG. 1, a schematic diagram of an embodiment of an indirect TPMS wheel sensor system 100 that utilizes MRFA in accordance with an embodiment is depicted. Wheel 110 is shown with a tire 112 and an ABS sensor system 120. The particular relative positions of ABS sensor system 120 and wheel 110 are merely exemplary and can vary in embodiments. Moreover, components in this and other figures herein are not necessarily drawn to scale. Because wheel 110 is a complex structure, there should be a multitude of resonances in response to complex vibrations occurring during movement. Embodiments utilize these multiple resonances to locate and isolate resonance peaks of different resonance modes, e.g., a radial vibration, r, and an angular vibration, $\omega$. Thus, tire 112 can be modeled as a complex arrangement of mechanical resonators, $\delta_\omega$ and $m_\omega$ for angular vibration, and $\delta_r$ and $m_r$ for radial vibration. In some embodiments, the vibration of tire 112 can be modeled as a two-dimensional model of mechanical resonators, while in other embodiments, tire 112 can be modeled as a three-dimensional model of mechanical resonators.

In some embodiments, the information sensed from the vibrations of the tire 112, such as by one or more sensors 114 mounted in or on, affixed to, embedded in, or otherwise coupled to tire 112, can be analyzed for a multidimensional resonance frequency within the ABS sensor system 120. In other embodiments, one or more sensors 114 can be mounted proximate but not in or on tire 112, such as on a rim, wheel, axel, vehicle body or other suitable place, though sensors so positioned may not be able to sense actual tire characteristics, such as material temperature. In some embodiments, the digitized information can be modulated onto the conventional ABS wheel speed clock signal generated by, for example, an encoder tooth wheel 122, for transmission to and analysis by an electronic control unit (ECU). According to embodiments, additional information about multidimensional resonances of the sensed signal that can include higher-order harmonics of the wheel rotation can be provided to the ECU, which can then be utilized to calculate a more accurate estimation of tire pressure while reducing warning latency, thereby providing a more robust system that balances provision of early warnings with false alarms.

Figure 2:
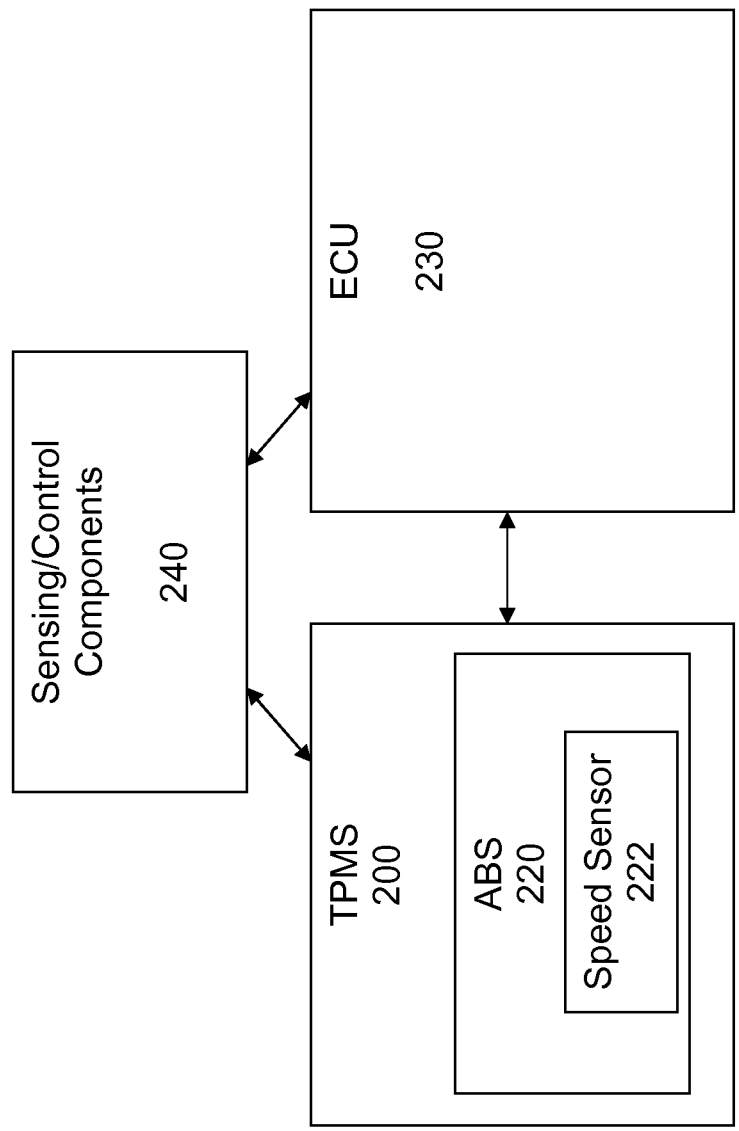
FIG. 2 is a block diagram of an indirect tire pressure monitoring system (TPMS) according to an embodiment.

Referring to FIG. 2, a block diagram is depicted of an indirect TPMS wheel sensor system 200 in accordance with an embodiment. System 200 is or comprises an ABS sensor system 220 including a speed sensor 222 in embodiments. For example, system 200 can comprise an ABS sensor system 220 with additional circuitry and/or algorithms in order to process TPMS data in one embodiment, or system 200 can comprise additional circuitry, algorithms and/or other sense and control components 240 external to ABS sensor system 220 to carry out the processing of the TPMS data. For example, one or more sensors 114 can comprise components 240, or those sensors 114 can be considered to be part of TPMS 200, with or without additional sensors as part of components 240. In one embodiment, the additional circuitry and/or algorithms can be part of an ECU 230 or signal processing system, though they need not be in all embodiments. Various additional data sensing and control system components 240 can also be provided in embodiments and can comprise one or more of an accelerometer sensor and/or system, an inertia sensor or sensor cluster, an ambient environment sensor and/or system and a vehicle control system, each of which can include various sensors and control arrangements known in the art to provide global vehicle parameter data, such as one or more of sensed data, operational data and/or control parameters for the vehicle.

Figure 3:
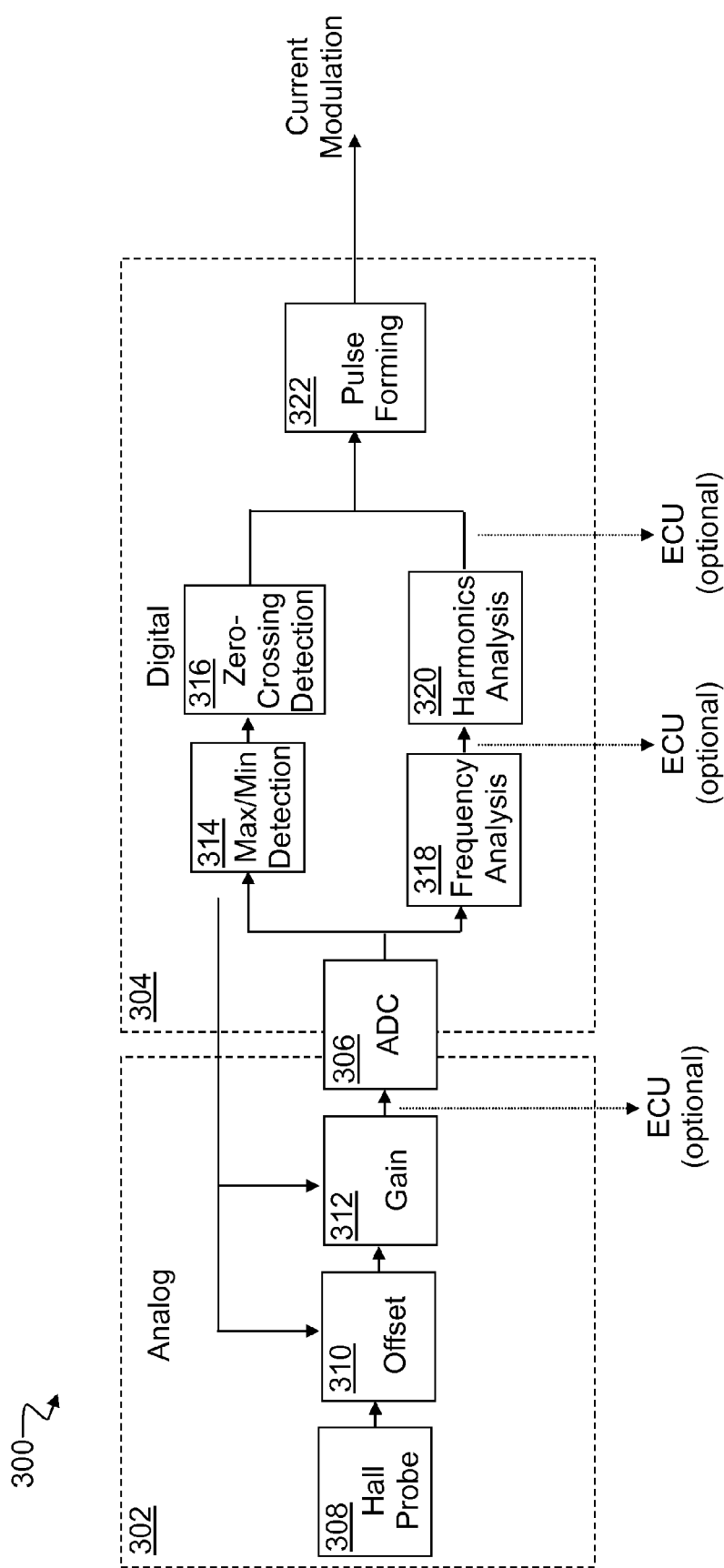
FIG. 3 is a block diagram of an indirect tire pressure monitoring system (TPMS) according to an embodiment.

Referring to FIG. 3, a block diagram of ABS sensor circuitry 300 in accordance with one embodiment is depicted. Circuitry 300 includes an analog portion 302 and a digital portion 304 coupled by an analog-to-digital (ADC) converter 306. Analog portion 302 comprises one or more Hall probes 308 or other magnetic field sensors, offset compensation circuitry 310 and gain circuitry 312. Digital portion 304 comprises maximum/minimum detection circuitry 314, zero-crossing detection circuitry 316, frequency analysis circuitry 318, analysis of harmonics circuitry 320 and pulse forming circuitry 322. Frequency analysis circuitry 318 and analysis of harmonics circuitry 320 form part of an indirect TPMS 324 in an embodiment. The depiction of system 300 is merely exemplary, and more or fewer circuitries, sensors and other components can be implemented in other embodiments. Moreover, the block diagram of FIG. 3 can be considered functional, such that some blocks depicted as being distinct can in fact be combined in actual implementation. Additionally, blocks depicted as being part of other blocks can, in other embodiments, be distinct therefrom or be part of other blocks, whether specifically depicted or not.

In one embodiment, information from indirect TPMS 200 is represented in a digital frame protocol format and is modulated onto the original ABS clock signal by adapting the pulse length to the state of the related bit of the frame. Thus, the ABS wheel speed signal is represented by the rising edge while the TPMS information is in the pulse duration of a sequence of pulses. Co-owned and co-pending U.S. application Ser. No. 13/751,335, entitled "A SIGNAL GENERATOR, A DECODER, A METHOD FOR GENERATING A TRANSMIT SIGNAL AND METHODS FOR DETERMINING SPEED DATA," filed Jan. 28, 2013, discloses additional information regarding communicating data between a sensor and an ECU or other control or processing system and is incorporated herein by reference in its entirety. As disclosed therein, a signal generator includes a signal provider and a signal processing unit. The signal provider is configured to provide a sensor signal indicating a repeatedly detected event, occurring within differing time intervals. The signal processing unit is configured to generate a transmit signal based on the sensor signal. The transmit signal includes event information representing the temporal occurrence of the event and additional information representing additional data. The event information includes pulses or signal edges associated to detected events, wherein the pulses or signal edges are temporarily separated within the transmit signal according to the differing time intervals of detected events so that each time interval of the differing time intervals includes one pulse or one signal edge associated with a detected event. Further, the additional data includes at least one frame including a predefined number of additional data bits. The information of the additional data bits of the at least one frame is distributed over at least two time intervals of the differing time intervals.

In one embodiment, information from indirect TPMS 200 is represented in analog form and transmitted as analog information. The magnetic field resulting from a rotating a magnetic pole wheel or magnetic tooth wheel is measured by a speed sensor and converted to a suitable protocol and provided to an ECU as the output signal having a speed data portion and an enhanced resonance data portion. Co-owned and co-pending U.S. patent application Ser. No. 13/903,088 entitled "WHEEL SPEED SENSOR AND INTERFACE SYSTEMS AND METHODS," filed May 28, 2013, discloses additional information regarding communicating data between a sensor and an ECU or other control or processing system and is incorporated herein by reference in its entirety. The speed sensor is herein configured to detect a magnetic field in response to speed and resonance characteristics. The speed sensor is also configured to generate a sensor output signal having speed data and enhanced resonance data which is received by the sensor output signal. The speed signal which is measured in the speed sensor and delivered as analog value can also be used as redundant information to the speed information that is encoded in the speed pulses of the classic ABS protocol. A sensor output signal may be generated having speed data and enhanced resonance data by selecting a first current level and a second current level, generating a magnetic field in response to a rotation that is influenced by tire vibrations, generating a field sensor output from the magnetic field and generating a sensor output signal from the field sensor output according to the selected first current level and the second current level, wherein the sensor output signal includes speed data and enhanced resonance data. A measurement system used in the indirect TPMS may comprise a magnetic field sensor configured to measure a magnetic field and to generate a field sensor output, a summation component configured to combine an offset with the field sensor output to provide a modified sensor output and a current modulation component configured to generate a sensor output signal from the modified sensor output, the sensor output signal having speed data and enhanced resonance data.

In another embodiment, a separate communication source, such as a wired or wireless connection, can be provided between indirect TPMS 200 and ECU 230. For example, a two- or three-wire connection between sensor 222 and/or other sensors of system 200 to ECU 230 can be used, which can provide an amplified and decoupled version of the analog sensor output as it enters ADC 306 or for some other digital signal or message from the ADC 306, FFT (e.g., circuitry 318) or resonance analysis. Several of these optional couplings are depicted in FIG. 3, and in various embodiments one or more of them can be used or omitted, and/or additional ones can be added, such that the particular depiction in FIG. 3 is merely exemplary of one of a variety of possibilities.

Figure 4:
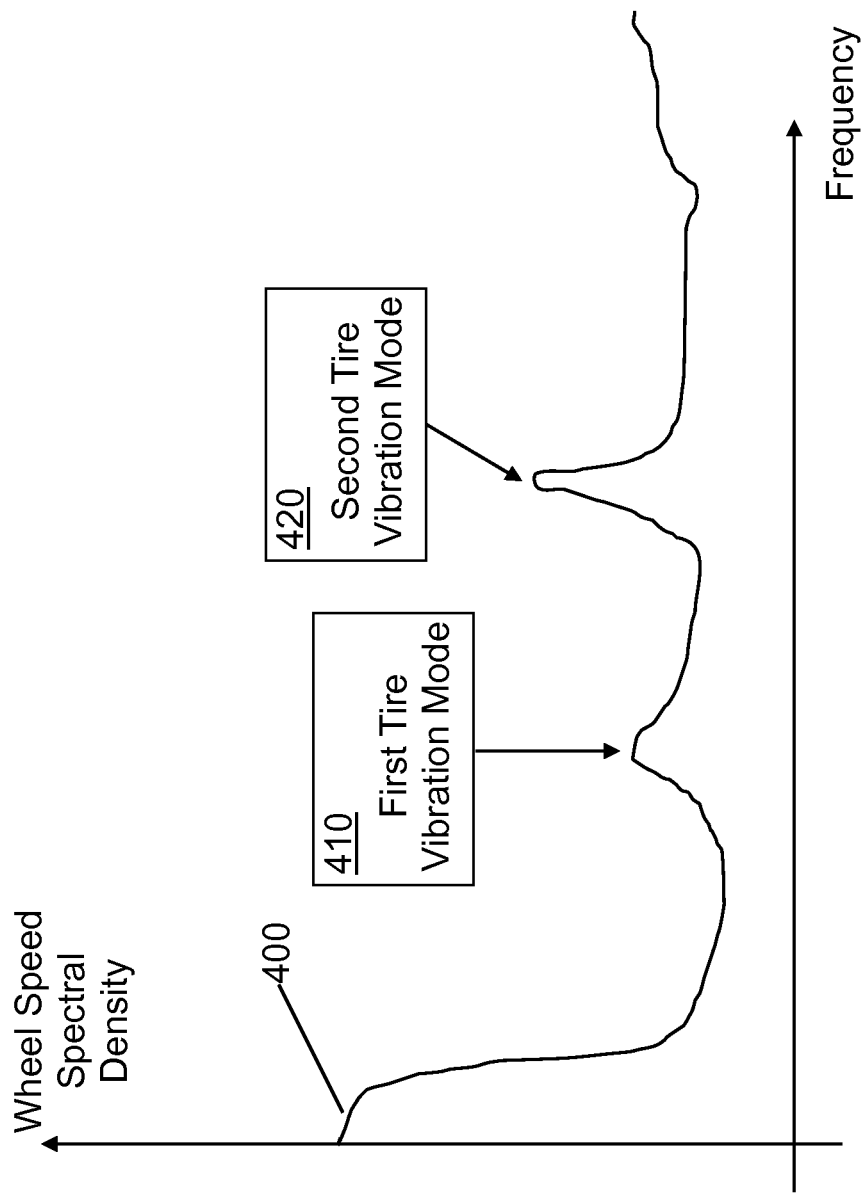
FIG. 4 is a graphical representation of a multidimensional frequency analysis according to an embodiment.

Referring to FIG. 4, a graphical representation of an MRFA according to an embodiment is shown for the sensed signal data representing wheel speed. Curve 400 represents the wheel speed spectral density based on actual average wheel speed. In this example, curve 400 two tire vibration modes are depicted. A first tire vibration mode is indicated at 410 and a second tire vibration mode is indicated at 420. In this example, the first vibration mode 410 has a weak dependence upon tire pressure, but a stronger dependence upon tire temperature, and the second vibration mode 420 has a strong dependence upon tire pressure and also a strong dependence upon tire temperature.

Here instead of using the influence of different parameters on different resonance frequencies, the absolute height of the resonance peaks or the quality factor of the resonance can be taken into account as well, which increases the diversity of the available effects, e.g., the pressure inside the tire can have a higher influence on the location of the resonance frequency while, e.g., the temperature of the rubber could have more influence on the internal friction and therefore cause a significant change of the damping and thus finally on the Q-factor of a resonance. The first resonance 410 is mainly influenced by parameters of the tire (e.g. a deformation that does not significantly change the volume) and therefore shows low pressure dependence but strong temperature dependence, for example. The second resonance is a pressure dependent effect (e.g., deformation of the tire cross-section that changes the volume) and is heavily temperature dependent as well. If at least one measurement in the frequency range of each vibration mode is available, the influencing parameters can be separated by use of equations that describe the dependence of the two measurements on each parameter, and the equations can be resolved for the independent parameters. For example, the strong temperature dependence of both modes 410 and 420 can be removed and the change in pressure isolated between modes 410 and 420.

In other embodiments, additional characteristics can be used to isolate the pressure, based on its dependence on other characteristics. If the dependence of the measurements on the independent parameters is too complex and/or the pressure cannot be isolated, a numerical meta model of a tire can be established based on a characterization of a tire type over variations of the independent parameters.

Additional analysis or inclusion of additional sensed data or parameters may be used to identify or isolate further vibrational resonance modes in the wheel speed data. For example, different measurements that can be utilized to extract the different influencing parameters could be multitudes or combinations of the following: a) frequency (location) of a resonance of the wheel speed, b) spectral density of the wheel speed at a resonance (maximum), c) spectral density of the wheel speed at a minimum, d) frequency (location) of a minimum, d) spectral density of the wheel speed in a fix distance from a maximum or minimum, e) Q factor of a resonance peak, f) spectral density of the wheel speed at a fix defined frequency, g) any of the previous measurements that are selected depending on the type or dimension of the tire, g) any of the previous measurements that are selected or interpreted depending on the actual speed of the observed wheel, h) any of the previous measurements that are selected or interpreted depending on accessible vehicle parameters (e.g. speed of the car, acceleration, load and its distribution, actuation of vehicle control systems (steering, breaking, power train, vehicle stability control, active damper, global chassis control), i) any of the previous measurements that are selected depending on already acquired measurement points, j) any of the previous measurements selected depending on already evaluated parameters (e.g. tire pressure or tire temperature), and/or k) non-tire related sensed data (e.g., ambient temperature, humidity), in various embodiments.

Based on the new system for the spectral analysis inside the sensor using high resolution data, it can be possible to locate more than just a small pressure dependent change of the analyzed spectrum that exceeds the noise floor. Embodiments, however, are not restricted to being used with a spectral analysis of the sensor device. For example, in other embodiments the noise sensitivity of the generated pulses can be reduced, including significantly, by one or more of the following techniques: reducing a distance between the sensor and pole wheel or other target in order to have a higher anticipated magnetic field strength; providing a stronger magnetization of the pole wheel or other target itself; implementing new or different sensing techniques, such as magnetoresistive (xMR) techniques including tunneling MR, TMR; and/or using higher quality, more precise, or other improved circuitry, though such circuitry may be balanced with, e.g., increased power consumption and other factors. In general, vibrations depend on multiple physical influences, with the tire pressure being only one, and others can include the temperature of the rubber material or the thickness of the profile. Furthermore, there typically is an influence from the aging of the rubber material that changes its flexibility due to a loss of softening plasticizer depending on time and ambient conditions. Since the different resonance modes represent different deformations of the tire during the vibration, it can be assumed that the influence of each parameter on each resonance is different. If multiple resonance effects are identified, these can be used to isolate the influence of the different parameters on tire pressure. In other embodiments, it can be possible to recognize the type of tire by comparison of the multiple resonance effects with known resonance signatures of tires based on size, model, materials and/or manufacturer. Or, conversely, data can be obtained and models built for each tire and/or each tire/vehicle combination and then stored in a memory of system 100 for use during operation.

Figure 5:
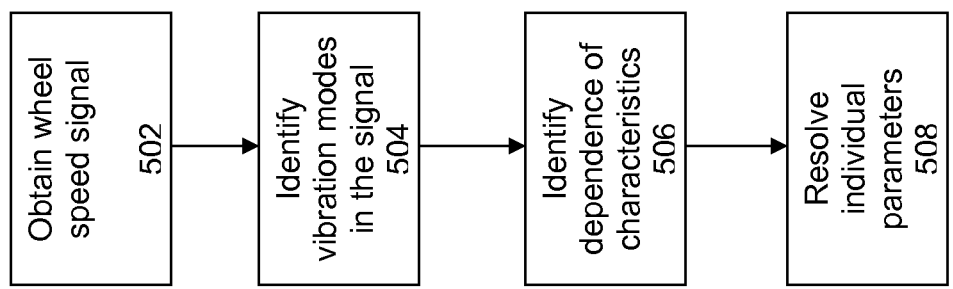
FIG. 5 is a flowchart of a method according to an embodiment.

Thus, in one embodiment and referring to FIG. 5, a wheel speed signal is obtained at 502. At 504, at least two vibration modes in the wheel speed signal are identified. Then, at 506, the characteristics influencing the vibration modes, including at least one characteristic of interest (e.g., tire pressure), are identified and, at 508, resolved to isolate at least one individual parameter of interest. In other embodiments, additional sensor signals and information can be used, e.g., other signals considered at 502.

One advantage of various embodiments is a more precise indirect tire measurement, since the influence of other parameters on the accuracy of the pressure estimation is isolated and removed. Furthermore various embodiments can allow generation of estimates of additional parameters like the rubber temperature that has significant influence on the road to wheel interface and is a valuable input to the braking and vehicle stability management, even without temperature sensors mounted in or on the tire itself.

Various embodiments of systems, devices and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the invention.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention can comprise a combination of different individual features selected from different individual embodiments, as understood by persons of ordinary skill in the art. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. An indirect tire pressure monitoring system (TPMS) comprising:

an antilock braking system (ABS) configured to provide a wheel speed signal; and an electronic control unit (ECU) coupled to the ABS and configured to process the wheel speed signal using a multidimensional resonance frequency analysis (MRFA) that includes a spectral analysis identifying a plurality of resonance frequencies associated with at least two tire vibration modes in the wheel speed signal and isolates at least one characteristic affecting the at least two tire vibration modes, wherein the ECU is configured to verify an estimated tire pressure based on at least one other parameter related to a combination of the at least two tire vibration modes.

2. The indirect TPMS of claim 1, wherein the wheel speed signal are transmitted over a wire conductor to the ECU.

3. The indirect TPMS of claim 2, wherein at least one additional wire conductor is provided to transmit at least one analog or digital signal to the ECU.

4. The indirect TPMS of claim 1, further comprising at least one other source of global vehicle parameter data that is available to the ECU.

5. The indirect TPMS of claim 4, wherein the at least one other source of global vehicle parameter data comprises at least one inertia sensor.

6. The indirect TPMS of claim 5, wherein at least one of the wheel speed signal or the at least one other source of global vehicle parameter data is used to identify the at least two tire vibration modes.

7. The indirect TPMS of claim 1, wherein the indirect TPMS provides an estimate for the at least one other parameter in addition to the estimated tire pressure based on an evaluation of the at least two tire vibration modes.

8. The indirect TPMS of claim 1, wherein the at least one other parameter is a temperature.

9. The indirect TPMS of claim 1, wherein the at least two tire vibration modes each relates to a different deformation of a tire.

10. The indirect TPMS of claim 1, further comprising memory circuitry configured to store tire model data for use in isolating the at least one characteristic.

11. The indirect TPMS of claim 1, wherein the at least one characteristic comprises a tire pressure.

12. An indirect tire pressure monitoring system (TPMS) comprising:

an antilock braking system (ABS) configured to provide a wheel speed signal; and an electronic control unit (ECU) coupled to the ABS and configured to process the wheel speed signal using a multidimensional resonance frequency analysis (MRFA) that includes a spectral analysis identifying a plurality of resonance frequencies associated with at least two tire vibration modes in the wheel speed signal and isolates at least one characteristic affecting the at least two tire vibration modes, wherein at least one of the at least two different tire vibration modes is identified from the spectral analysis at a level below a conventional signal to noise ratio (SNR) of a wheel speed spectrum extracted from a conventional ABS sensor signal.

13. The indirect TPMS of claim 1, wherein the ECU includes a digital signal processor (DSP) that performs at least part of the MFRA.

14. A method of indirect tire pressure monitoring of individual tires on a vehicle comprising:

extracting data from an antilock braking system (ABS) for a tire, the data representative of wheel speed of the tire; and using a signal processing system to analyze the data to determine a plurality of resonance frequencies associated with the data, and to analyze the plurality of resonance frequencies to determine at least an estimated tire pressure for the tire, wherein the signal processing system comprises an electronic control unit (ECU), wherein analyzing the data further comprises identifying at least one of the plurality of resonance frequencies from a spectral analysis at a level below a conventional signal to noise ratio (SNR) of a wheel speed spectrum extracted from a conventional ABS sensor signal.

15. The method of claim 14, further comprising communicating the estimated tire pressure to one of a vehicle control system, a vehicle operator or a service technician.

16. The method of claim 14, further comprising transmitting the data from the ABS to the signal processing system over a wire conductor.

17. The method of claim 14, wherein analyzing the data further comprises identifying characteristics affecting at least one of the plurality of resonance frequencies.

18. The method of claim 17, further comprising storing in a memory a result of the identifying.

* * * * *